United States Patent Office 3,506,764
Patented Apr. 14, 1970

3,506,764
WATER TREATMENT COMPOSITION FOR USE IN A MARINE COMMODE SYSTEM AND PROCESS FOR USE THEREOF
Thomas E. Schneider, Jr., and James L. Halley, Atlanta, Ga., assignors to Tesco Chemicals, Inc., Atlanta, Ga., a corporation of Georgia
No Drawing. Filed Oct. 28, 1968, Ser. No. 771,290
Int. Cl. C02b 1/36
U.S. Cl. 424—249        13 Claims

ABSTRACT OF THE DISCLOSURE

A water treatment composition for use in a marine commode system comprising a potassium salt of dichloroisocyanuric acid; a blend of microcrystalline cellulose and either methyl cellulose or an alkali metal compound of carboxymethyl-cellulose; and a metallic salt of an aliphatic carboxylic acid having at least 10 carbon atoms.

---

The present invention relates to sanitizing and/or disinfecting water treatment compositions and to the method of preparing such compositions. More particularly the present invention relates to shaped water treatment compositions which rapidly but controllably liberate active and/or available chlorine into aqueous waste solutions within a marine commode system.

When waste is discharged from a marine commode system, it is usually pumped overboard into the water adjacent the boat or ship. If the boat is a great distance from shore, the presence of the waste in the water may present no problem since the waste may disperse and decay before it reaches the shore or other location where it might contaminate the water and otherwise be harmful. When the boat is closer to the shore, as when passing adjacent the shore line or when docked, the exhausted waste from the boat may create a serious pollution hazard.

In order to reduce or eliminate water pollution from the discharge of waste from boats and the like, various chemicals have been mixed with the waste prior to its being discharged overboard. A typical system includes the process of flowing water from under the boat toward a commode, mixing liquid or gaseous chlorine with the water, and flowing the mixture through the commode. In order to properly utilize liquid chlorine in such a system, it is necessary to provide a metering device to control the flow of liquid chlorine into the stream of purging water, and to provide a liquid chlorine container. The container of liquid chlorine must be carefully stored and delicately handled when being connected to the commode. Because of the nature of the chemical involved, the equipment utilized to mix the chlorine with the purging water must be frequently and carefully inspected to determine if it is operating properly, since the equipment is subject to clogging. Also, the supply of liquid chlorine in the commode system is subject to depletion without notice, and the chlorine supply must be frequently inspected.

Thus it is an object of this invention to provide a shaped chlorinating composition for use in a marine commode system.

Another object of the present invention is to provide a shaped chlorine-liberating composition which may be efficiently and effectively used with metering devices for disseminating active and/or available chlorine into a marine commode system.

A further object of the present invention is to provide a shaped chlorine-liberating composition having a substantially constant erosion rate under constant conditions when used in a metering device of the water-jet type.

Another object of the present invention is to provide a shaped chlorine-liberating composition for use with a metering device to establish a sufficient concentration level of active and/or available chlorine in a marine commode system to kill and/or inhibit the growth of intestinal flora and micro-organisms.

These and other objects, features and advantages of the present invention will be apparent to those skilled in the art from the following description.

According to the present invention, the novel chlorine-liberating composition is initially formulated by intimately and uniformly blending together the following compounds: a potassium salt of dichloroisocyanuric acid; a blend of microcrystalline cellulose and either methyl cellulose or an alkali metal compound of carboxymethyl-cellulose; and a metallic salt of an aliphatic carboxylic acid having at least 10 carbon atoms. When blending these components it is preferred that they be in substantially dry form. The blending of the various components is preferably accomplished by mechanical means which are commonly employed in mixing dry or substantially dry materials, such as for example, stirring, tumbling, and the like. It is important, however, that the mixing be carried out in such a manner that the particle size of the particles of the various components is not appreciably altered in mixing the dry materials; tumbling in a rotating tumbler is particularly preferred.

The size of the particles of the various components used to prepare the novel compositions of the present invention has a significant effect on the shaped chlorinating composition, specifically the erosion and/or dissolution rate. The dichloroisocyanuric acid compound and the blend of cellulose and either methyl cellulose or carboxymethylcellulose compound should be in a granular form, that is, the particles thereof should pass through a No. 10 mesh U.S. Standard Screen and preferably substantially all (at least 90%) of the particles should be retained on a No. 100 mesh U.S. Standard Screen. The particle size of the particles of the aliphatic carboxylic acid compound is usually in the range between 1 to 100 microns and preferably between 1 and 50 microns, i.e. powdered material. The powdered material acts not only as a lubricant for the stick while it is being compressed, but such material also effects the erosion and/or dissolution rates of the shaped composition when the composition is contacted with an aqueous media.

The mixture of components, prepared as described above, may then be converted or compressed into a variety of configurations to provide the shaped composition of the present invention. Forming is usually accomplished by conventional pressure molding in the absence of heat wherein a variety of molding pressures may be employed. Merely by way of example, satisfactory pressures in the range of 400 to 1500 p.s.i. have been employed. Preferably 450 p.s.i. is employed. The typical configuration is commonly referred to as the "stick" form which is a solid cylindrically shape or tubular article.

The present shaped compositions, when contacted with a selected volume of water under conditions conductive to erosion and for a prescribed period of time, will erode rapidly but uniformly to supply a predetermined amount of active and/or available chlorine to the selected volume of water. A suitable marine commode system which may use the present shaped composition is disclosed in the U.S. patent application Ser. No. 784,673 of Thomas E. Schneider, Jr., entitled "Waste Treatment Method and Apparatus," filed on Dec. 18, 1968. In the Schneider apparatus, the present composition would normally erode from about 1.5 to about four ounces with each flush or operation of the system which normally lasts about 15 seconds. It has been found that such an amount of the present composition dissolved or dispersed in the amount of flush water selected by the Schneider apparatus is capable of reducing the active Coliform count of the waste material to zero.

As should be apparent from the above description, the active and/or available chlorine of the composition blend is provided by the dichloroisocyanuric acid compound. Particularly superior results are achieved through the use of potassium dichloroisocyanurate. The relative proportions of the individual components within the composition may vary only over a relatively limited range and still produce a shaped chlorine-liberating composition having the desirable characteristics as previously described. In particular, the quantity of potassium dichloroisocyanurate should range from about 75 percent by weight to about 99 percent by weight of the total composition. It is pointed out, however, that for best results it is preferred to employ a quantity of dichloroisocyanuric acid compound approximating 90.5% by weight of the total weight of the shaped composition.

The second component of the shaped composition serves to promote the rapid but uniform erosion thereof and comprises a microcrystalline cellulose blended with either methyl cellulose or an alkali metal compound of carboxymethylcellulose such as is found in Avicel RC (commercially available from the American Viscose Division of the FMC Corporation). A blend normally comprises about 88 to about 92 parts by weight microcrystalline cellulose and about 8 to about 12 parts by weight methyl cellulose or carboxymethylcellulose. Preferably the blend comprises about 92 parts microcrystalline cellulose and about 8 parts carboxymethylcellulose. Superior results are obtained when the microcrystalline cellulose of the preferred blend is blended with sodium carboxymethylcellulose. It has been found that the use of from about 2% to about 15% by weight of the blended component, based on the total weight of the composition, yields suitable results; but that superior results are achieved through the use of about 7.5% by weight of the component.

The remaining component of the blend, namely the metallic salt of an aliphatic carboxylic acid having at least ten carbon atoms is a substantially inert ingredient with respect to the chlorine-liberating capability of the shaped composition. However, this component does serve a necessary and important purpose in the shaped composition; first as a lubricant to aid in the molding operations and second as a binder for the active chlorine ingredients. It is desirable to maintain the percentage of this combination lubricant-binder material in the shaped compound as low as possible consistent with its intended purpose. In this manner the shaped composition will have a higher content of active ingredients per unit weight and consequently a higher active and/or available chlorine content per unit weight. Generally, the amount of lubricant-binder material present in the shaped compound ranges from about 0.5% to about 5% by weight based on the total weight of the composition; it is preferred that about 2% by weight be employed.

As previously mentioned the binder material comprises a metallic salt of an aliphatic carboxylic acid having at least ten carbon atoms. By way of example, these binders include the alkali metal salts such as sodium, potassium and lithium salts; the alkaline earth metal salts such as calcium and barium salts; and zinc and magnesium salts of fatty acids. However, the alkali metal oleates, palmitates and stearates and the like as well as the corresponding alkaline earth salts and zinc and magnesium salts are particularly suitable; with the calcium and sodium stearates being preferred. In addition, it has been found that in marine commode system applications, sodium stearate is the most preferred.

The following examples are presented in an effort to thoroughly describe the invention. In the examples parts and percentages are by weight unless otherwise indicated.

EXAMPLE NO. 1

A chlorine-liberating composition comprising 90.5 parts by weight potassium dichloroisocyanurate, 7.5 parts of a dried blend of 92 weight percent microcrystalline cellulose and 8 weight percent sodium carboxymethylcellulose (commercially available as Avicel RC), and 2 parts sodium stearate is intimately blended into a uniform mixture. The blended composition is then molded under 450 p.s.i. into one pound cylindrical sticks of approximately 2½ inches in diameter and approximately 5¼ inches in length.

One of the composition sticks is tested in a marine commode system such as disclosed in the previously mentioned U.S. patent application of Thomas E. Schneider, Jr. During several 15-second operations it is found that approximately 4 ozs. of the stick composition are eroded with each operation of the system and that each operation effectively reduces the active Coliform count of the waste material to zero. The stick exhibits good stability and uniformity in erosion rate.

EXAMPLE NO. 2

A chlorine-liberating composition comprising 89.5 parts by weight potassium dichloroisocyanurate, 10 parts of a dried blend of 92 weight percent microcrystalline cellulose and 8 weight percent sodium carboxymethylcellulose (commercially available as Avicel RC), and 0.5 parts sodium stearate is intimately blended into a uniform mixture. The blended composition is then molded under 450 p.s.i. into one pound cylindrical sticks of approximately 2½ inches in diameter and approximately 5¼ inches in length.

One of the composition sticks is tested in a marine commode system such as disclosed in the previously mentioned U.S. patent application of Thomas E. Schneider, Jr. During several 15-second operations it is found that approixmately 3 ozs. of the stick composition are eroded with each operation of the system and that each operation effectively reduces the active Coliform count of the waste material to zero. The stick exhibits good stability and uniformity in erosion rate.

EXAMPLE NO. 3

A chlorine-liberating composition comprising 96 parts by weight potassium dichloroisocyanurate, 3 parts of a dried blend of 92 weight percent microcrystalline cellulose and 8 weight percent sodium carboxymethylcellulose (commercially available as Avicel RC), and 2 parts sodium stearate is intimately blended into a uniform mixture. The blended composition is then molded under 450 p.s.i. into one pound cylindrical sticks of approximately 2½ inches in diameter and approximately 5¼ inches in length.

One of the composition sticks is tested in a marine commode system such as disclosed in the previously mentioned U.S. patent application of Thomas E. Schneider, Jr. During several 15-second operations it was found that approximately 2 ozs. of the stick composition are eroded with each operation of the system and that each operation effectively reduces the active Colform count of the waste material to zero. The stick exhibits good stability and uniformity in erosion rate.

EXAMPLE NO. 4

A chlorine-liberating composition comprising 90.5 parts by weight potassium dichloroisocyanurate, 7.5 parts of a dried blend of 92 weight percent microcrystalline cellulose and 8 weight percent sodium carboxymethylcellulose (commercially available as Avicel RC), and 2 parts sodium stearate is intimately blended into a uniform mixture. The blended composition is then molded under 500 p.s.i. into one pound cylindrical sticks of approximately 2½ inches in diameter and approximately 5¼ inches in length.

One of the composition sticks is tested in a marine commode system such as disclosed in the previously mentioned U.S. patent application of Thomas E. Schneider, Jr. During several 15-second operations it is found that approximately 2 ozs. of the stick composition are eroded with each operation of the system and that each operation effectively reduces the active Coliform count of the waste material to zero. The stick exhibits good stability and uniformity in erosion rate.

The above examples demonstrate that the shaped chlorine-liberating compositions of the present invention are capable of being selectively metered at a reasonable erosion rate into a supply of water so as to maintain a sufficient active and/or available chlorine concentration therein to effectively reduce the amount of active intestinal flora and microorganisms.

While the composition blends in the above examples have been formed into rod or stick-like shapes, other shapes and forms are also within the scope of the present invention. Generally, the particular shape will be dictated by the specific type of metering device with which the shaped composition blend is to be employed.

While the present invention has been described in detail with particular reference to preferred embodiments thereof, it will be understood that variations and modifications can be effected within the spirit and scope of the invention as described hereinbefore and as defined in the appended claims.

We claim:

1. A blended composition for use in treating an aqueous solution of waste material to inhibit or reduce the active amount of intestinal flora and microorganisms therein compirsing (A) about 75% to 99% by weight of a potassium salt of dischloroisocyanauric acid; (B) about 2% to about 15% by weight of a blend of microcrystalline cellulose and at least one of methyl cellulose and an alkali metal compound of carboxymethylcellulose; (C) and about 0.5% to about 5% by weight of a metallic salt of an aliphatic carboxylic acid having at least 10 carbon atoms; the percentage of each component being based on the total weight of the blended composition.

2. A blended composition according to claim 1 wherein component (B) comprises a blend of about 88% to about 92% by weight of an alkali metal compound of carboxymethylcellulose.

3. A blended composition according to claim 1 comprising about 90.5% by weight of a potassium salt of dichloroisocyanuric acid; about 7.5% by weight of a blend of about 92 weight percent of microcrystalline cellulose and about 8 weight percent of an alkali metal compound of carboxymethylcellulose; and about 2% by weight of a metallic salt of an aliphatic carboxylic acid having at least 10 carbon atoms.

4. A blended composition according to claim 1 wherein the salt of dichloroisocyanuric acid comprises potassium dichloroisocyanurate; the compound of carboxymethylcellulose comprises sodium carboxymethylcellulose; and the salt of an aliphatic carboxylic acid comprises sodium stearate.

5. A blended composition according to claim 3 wherein the salt of dischloroisocyanuric acid comprises potassium dichloroisocyanurate; the compound of carboxymethylcellulose comprises sodium carboxymethylcellulose; and the salt of an aliphatic carboxylic acid comprises sodium stearate.

6. A process for preparing a shaped chlorine-liberating composition comprising (A) blending about 75% to about 99% by weight of a potassium salt of dichloroisocyanuric acid with about 2% to about 15% by weight of a blend of microcrystalline cellulose and at least one of methyl cellulose and an alkali metal compound of carboxymethylcellulose, and about 0.5% to about 5% by weight of a metallic salt of an aliphatic carboxylic acid having at least 10 carbon atoms, the percentage of each component being based on the total weight of the blended composition; and (B) molding the blend into a shaped chlorinating composition.

7. The process of claim 6 wherein the blended composition of step (A) comprises about 90.5% by weight of a potassium salt of dichloroisocyanuric acid, about 7.5% by weight of a blend of about 92 weight percent of microcrystalline cellulose and about 8 weight percent of an alkali metal compound of carboxymethylcellulose, and about 2% of a metallic salt of an aliphatic carboxylic acid having at least 10 carbon atoms.

8. The process of claim 6 wherein the salt of dichloroisocyanuric acid comprises potassium dichloroisocyanurate; the compound of carboxymethylcellulose comprises sodium carboxymethylcellulose; and the salt of an aliphatic carboxylic acid comprises sodium stearate.

9. The process of claim 7 wherein the salt of dichloroisocyanuric acid comprises potassium dichloroisocyanurate; the compound of carboxymethylcellulose comprises sodium carboxymethylcellulose; and the salt of an aliphatic carboxylic acid comprises sodium stearate.

10. A process for inhibiting or reducing the growth of active intestinal flora and microorganisms in an aqueous solution of waste material comprising treating the waste solution with a disinfectant solution containing the composition of claim 1 dissolved or dispersed therein.

11. A process for inhibiting or reducing the growth of active intestinal flora and microorganisms in an aqueous solution of waste material comprising treating the waste solution with a disinfectant solution containing the composition of claim 3 dissolved or dispersed therein.

12. A process for inhibtiing or reducing the growth of active intestintal flora and microorganisms in an aqueous solution of waste material comprising treating the waste solution with a disinfectant solution containing the composition of claim 4 dissolved or dispersed therein.

13. A process for inhibiting or reducing the growth of active intestinal flora and microorganisms in an aqueous solution of waste material comprising treating the waste solution with a disinfectant solution containing the composition of claim 5 dissolved or dispersed therein.

References Cited

UNITED STATES PATENTS

| 3,342,674 | 9/1967 | Kowalski | 252—187 X |
| 3,412,021 | 11/1968 | Paterson | 210—62 |
| 3,457,167 | 7/1969 | Spiegel et al. | 210—62 X |
| Re. 24,412 | 12/1957 | Hardy | 252—99 |
| 3,130,124 | 4/1964 | Ferris et al. | 71—67 |
| 3,296,069 | 1/1967 | Kowalski | 424—14 |

MICHAEL E. ROGERS, Primary Examiner

U.S. Cl. X.R.

210—62; 252—187; 260—248; 424—14